(12) United States Patent
Petzl et al.

(10) Patent No.: US 8,060,994 B2
(45) Date of Patent: Nov. 22, 2011

(54) CARABINER WITH PIVOTING GATE EQUIPPED WITH A LOCKING RING

(75) Inventors: Paul Petzl, Barraux (FR); Christophe Choffy, Saint Hilaire du Touvet (FR); Raphaël Lanez, Crolles (FR)

(73) Assignee: ZEDEL, Crolles (FR)

( * ) Notice: Subject to any disclaimer, the term of this patent is extended or adjusted under 35 U.S.C. 154(b) by 574 days.

(21) Appl. No.: 12/222,269

(22) Filed: Aug. 6, 2008

(65) Prior Publication Data
US 2009/0056088 A1 Mar. 5, 2009

(30) Foreign Application Priority Data
Aug. 31, 2007 (FR) ...................... 07 06123

(51) Int. Cl.
*F16B 45/02* (2006.01)
(52) U.S. Cl. ...................... 24/600.2; 24/600.1; 24/600.9; 24/599.9; 24/601.5
(58) Field of Classification Search ................. 24/600.2, 24/600.1, 601.1, 601.5, 599.5, 599.9, 599.6
See application file for complete search history.

(56) References Cited

U.S. PATENT DOCUMENTS

| | | | | |
|---|---|---|---|---|
| 558,056 A * | 4/1896 | Fechner | ........................ | 24/599.5 |
| 854,293 A * | 5/1907 | Johnson | ........................ | 294/82.2 |
| 1,473,983 A * | 11/1923 | White | ........................ | 294/82.21 |
| 6,588,076 B1 * | 7/2003 | Choate | ........................ | 24/600.2 |
| 7,320,159 B2 * | 1/2008 | Petzl et al. | ................... | 24/599.5 |
| 2003/0167608 A1* | 9/2003 | Petzl et al. | ................... | 24/600.2 |
| 2006/0042617 A1* | 3/2006 | Stevens | ........................ | 124/74 |
| 2006/0137151 A1* | 6/2006 | Thompson | ................... | 24/598.2 |

FOREIGN PATENT DOCUMENTS

| | | |
|---|---|---|
| DE | 25 36 204 | 2/1977 |
| DE | 296 10 293 U1 | 12/1996 |
| FR | 2 803 343 A1 | 7/2001 |

* cited by examiner

*Primary Examiner* — Robert Sandy
*Assistant Examiner* — Rowland D Do
(74) *Attorney, Agent, or Firm* — Oliff & Berridge, PLC

(57) ABSTRACT

A carabiner includes a fixed C-shaped body equipped with a securing part, and a gate movable around a pivoting axis between a closed position and an open position. The gate includes a latching part and a locking ring fitted coaxially around the gate. An end head of the gate partially surrounds the securing part in the closed position, and includes a shoulder acting as end-of-travel stop for the ring in the locked position.

5 Claims, 6 Drawing Sheets

CARABINER WITH PIVOTING GATE EQUIPPED WITH A LOCKING RING

BACKGROUND OF THE INVENTION

The invention relates to a carabiner comprising a fixed C-shaped body having a first end shaped as a securing part and a second end for articulation of a gate movable around a pivoting axis between a closed position and an open position, said gate comprising:

a latching part situated opposite the pivoting axis to operate in conjunction with the securing part in the closed position, a return spring biasing the gate to the closed position, and a locking ring fitted coaxially around the gate and having a smaller length than that of the gate, said ring being movable between a first locked position enabling the gate to be locked in the closed position and a second unlocked position enabling the gate to be moved to the open position.

STATE OF THE ART

In a known carabiner of the kind mentioned, for example as described in the document DE 2536204, the movable gate is generally formed by a metal bar of cylindrical cross-section, and the coaxial locking ring presents a larger external diameter than that of the bar. When the locking ring is moved to the closed and locked position of the gate, an offset remains between the ring and the carabiner body. The presence of this offset is liable to hamper sliding of the rope inside the body.

OBJECT OF THE INVENTION

The object of the invention consists in providing a carabiner with a locking ring, limiting any risk of catching on the rope when the gate is closed and locked.

The carabiner according to the invention is characterized in that the latching part is capped by an end head partially surrounding the securing part in the closed position of the gate and comprising a shoulder acting as end-of-travel stop for the ring in the first locked position.

According to a preferred embodiment, the end head is provided with a frustum-shaped lateral portion presenting an angle of incline comprised between 10° and 20° with respect to the rapport longitudinal direction of the gate, and with a frontal groove for passage of the securing part.

The presence of the frustum-shaped end head avoids any offset with the internal profile of the carabiner and enables the rope to slide well inside the body when the gate is closed.

The male securing part comprises a tab and a protuberance forming an inverted T-shape and the female latching part is provided with a recess receiving the securing part. The external diameter of the shoulder corresponds substantially to the diameter of the locking ring.

In the case of a screw-type locking ring, a first thread inside the ring operates in conjunction by screwing with a second thread of the gate, which has a smaller number of thread turns than that of the first thread.

BRIEF DESCRIPTION OF THE DRAWINGS

Other advantages and features will become more clearly apparent from the following description of different embodiments of the invention given for non-restrictive example purposes only and represented in the accompanying drawings, in which.

DETAILED DESCRIPTION OF THE INVENTION

Figure 1:
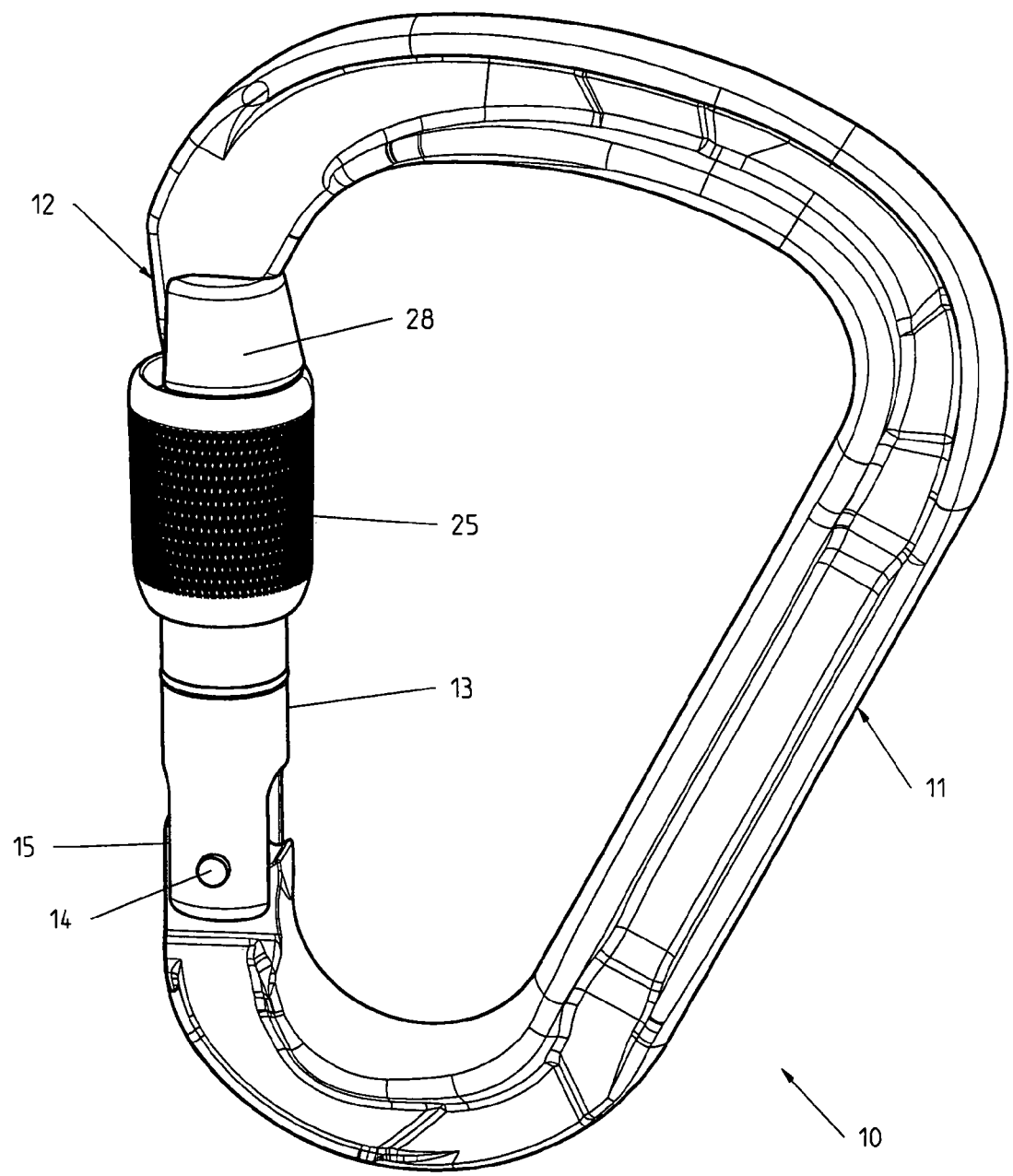
FIG. 1 is a perspective view of a carabiner according to the invention, the gate being in the closed and locked position.
Figure 2:
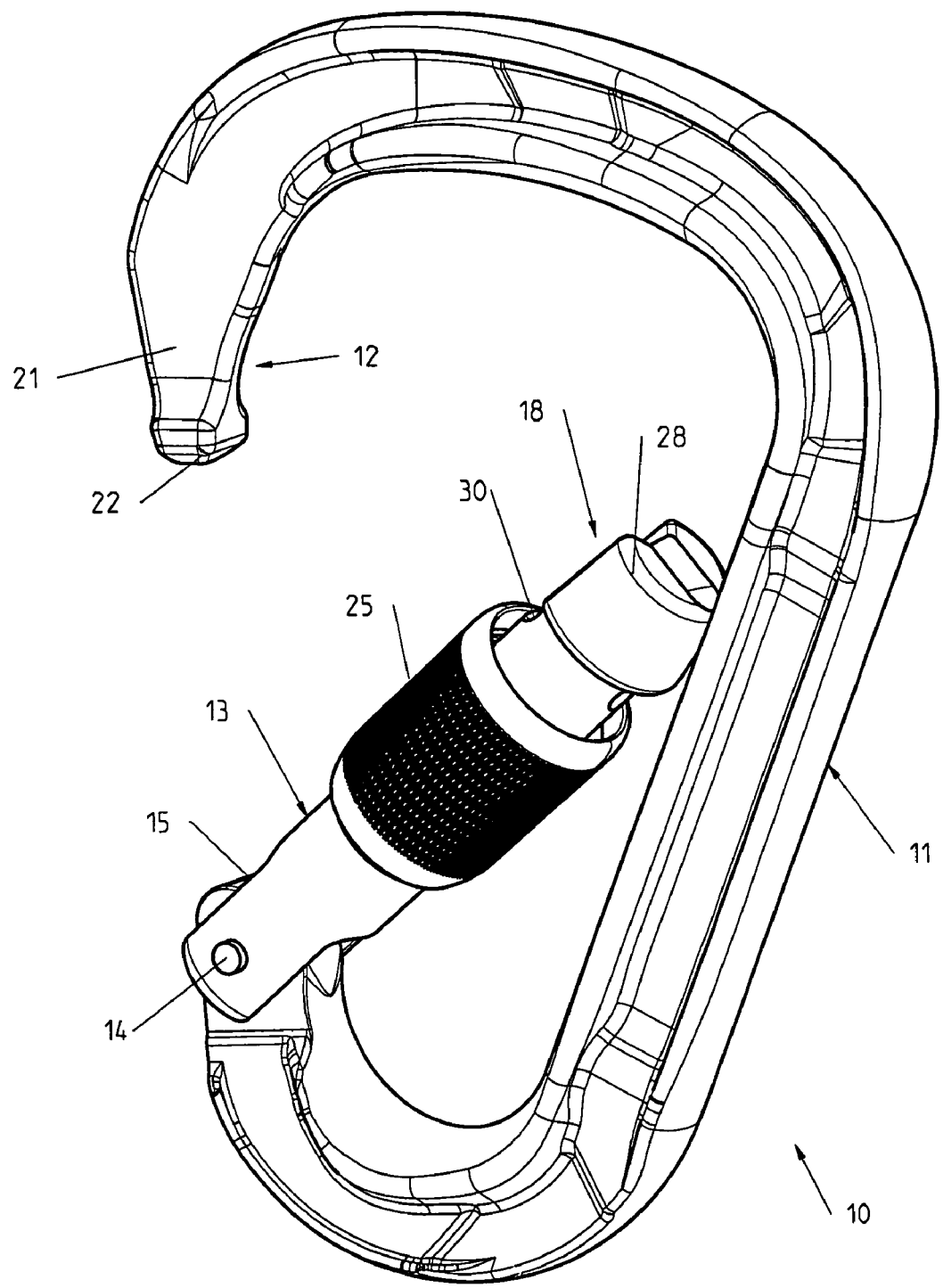
FIG. 2 shows an identical view to FIG. 1 when the gate is in the open and unlocked position.

With reference to the figures, a carabiner 10 comprises a C-shaped metal body 11 having a first end provided with a male securing part 12 and a second end for articulation of a gate 13 movable around a pivoting axis 14 between a closed position (FIGS. 1 and 3) and an open position (FIG. 2).

Gate 13 comprises a metal bar comprising a reverse U-shaped cap 15 designed to cap the second end of the body 11, two orifices being drilled diametrically opposite holes 16, 17 in said cap for the pivoting axis 14 to pass. The opposite end of gate 13 is provided with a female latching part 18 designed to engage in male securing part 12 in the closed position. A return spring 19 is housed in a blind opening 20 of gate 13 on the same side as the axis 14 and biases gate 13 to the closed position.

Male securing part 12 of body 11 presents an inverted T-shaped structure comprising a tab 21 extended by a protuberance 22. Female latching part 18 of gate 13 comprises a recess 23 of conjugate shape to male securing part 12, and a hole 24 opening out at the rear and in communication with recess 23.

A locking ring 25 is fitted coaxially around gate 13 and presents a smaller length than the latter. The internal cylindrical wall of locking ring 25 is provided with a first thread 26 designed to operate by screwing and unscrewing in conjunction with a second thread 27 of gate 13. Locking ring 25 is thereby movable by translation along gate 13 between a first locked position (FIG. 3) enabling gate 13 to be locked in the closed position and a second unlocked position (FIG. 2) enabling gate 13 to move towards the inside of the body corresponding to the open position.

Second thread 27 of gate 13 is arranged longitudinally between cap 15 and female latching part 18 and comprises a smaller number of thread turns than that of first thread 26 of locking ring 25.

Female latching part 18 further comprises an end head 28 in the form of a frustum-shaped cap joined to the end of gate 13 by a shoulder 29 acting as stop for ring 25 at the end of screwing travel to the first locked position. The top of end head 28 is flat and the frontal part is cut by a groove 31 to enable tab 21 and protuberance 22 to enter female latching part 18.

Figure 6:
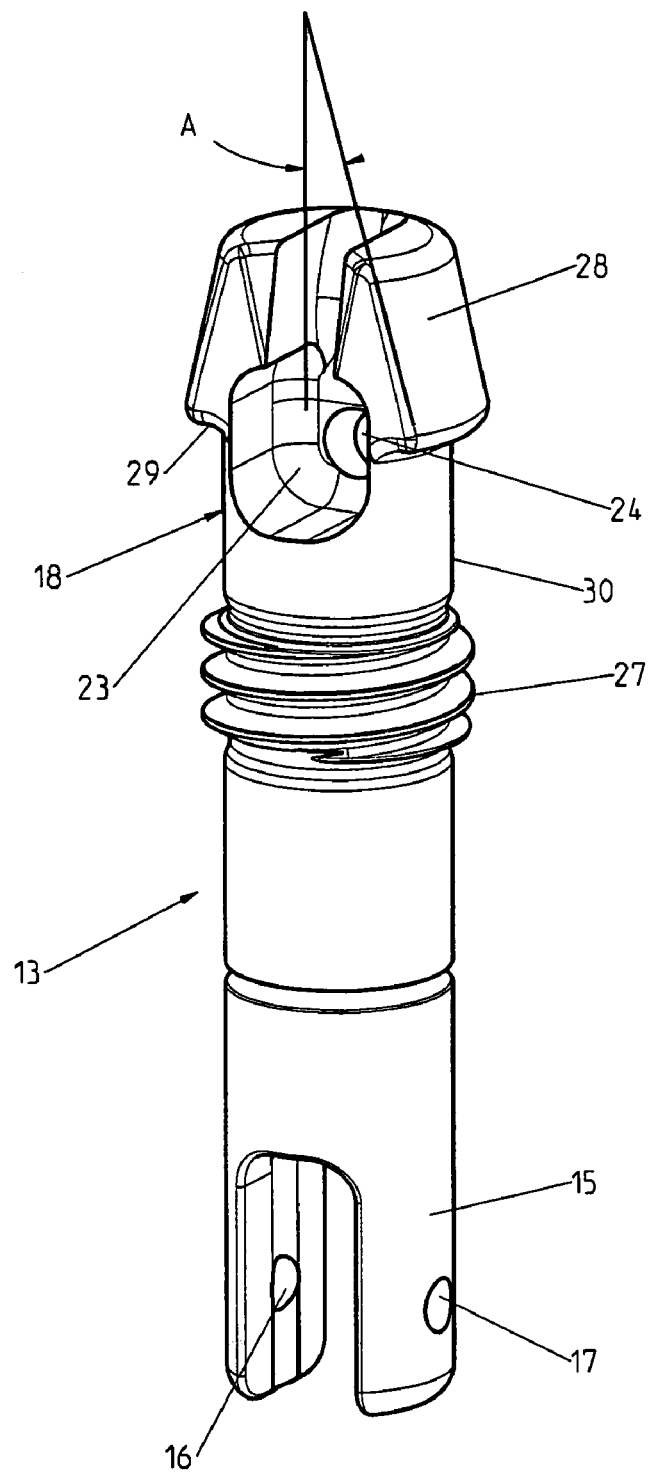

The angle of incline A (FIG. 6) of frustum-shaped end head 28 with the longitudinal direction of gate 13 is comprised between 10° and 20°, preferably 11°, so as to connect without any offset with the shape of tab 21 of the first end of body 11 when gate 13 is in the closed position.

The cylindrical periphery of gate 13 situated between second thread 27 and shoulder 29 comprises a colored, for example red, coating 30, visible in the unlocked state of locking ring 25.

Figure 3:
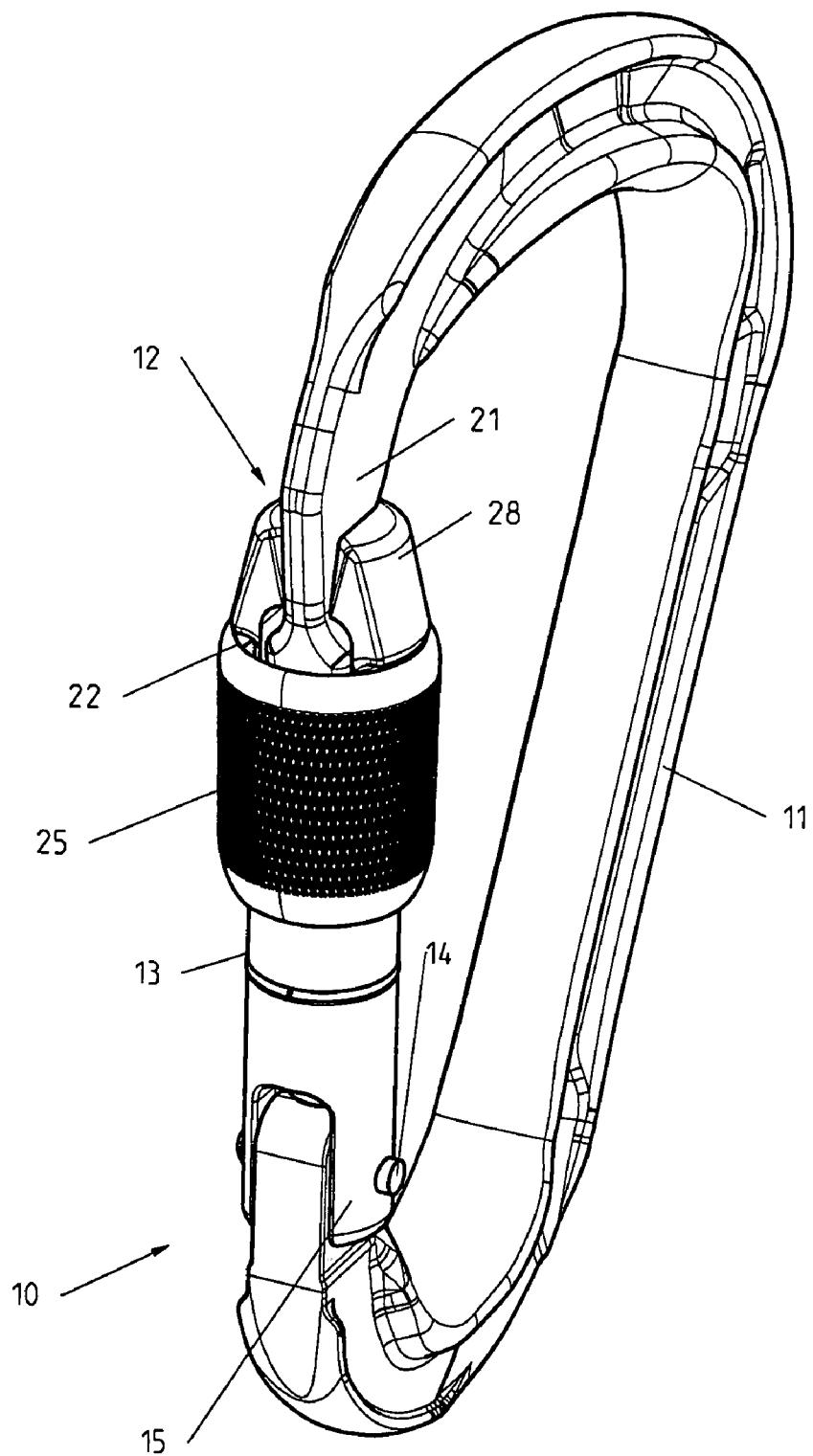
FIG. 3 represents a side view of the carabiner of FIG. 1.
Figure 4:
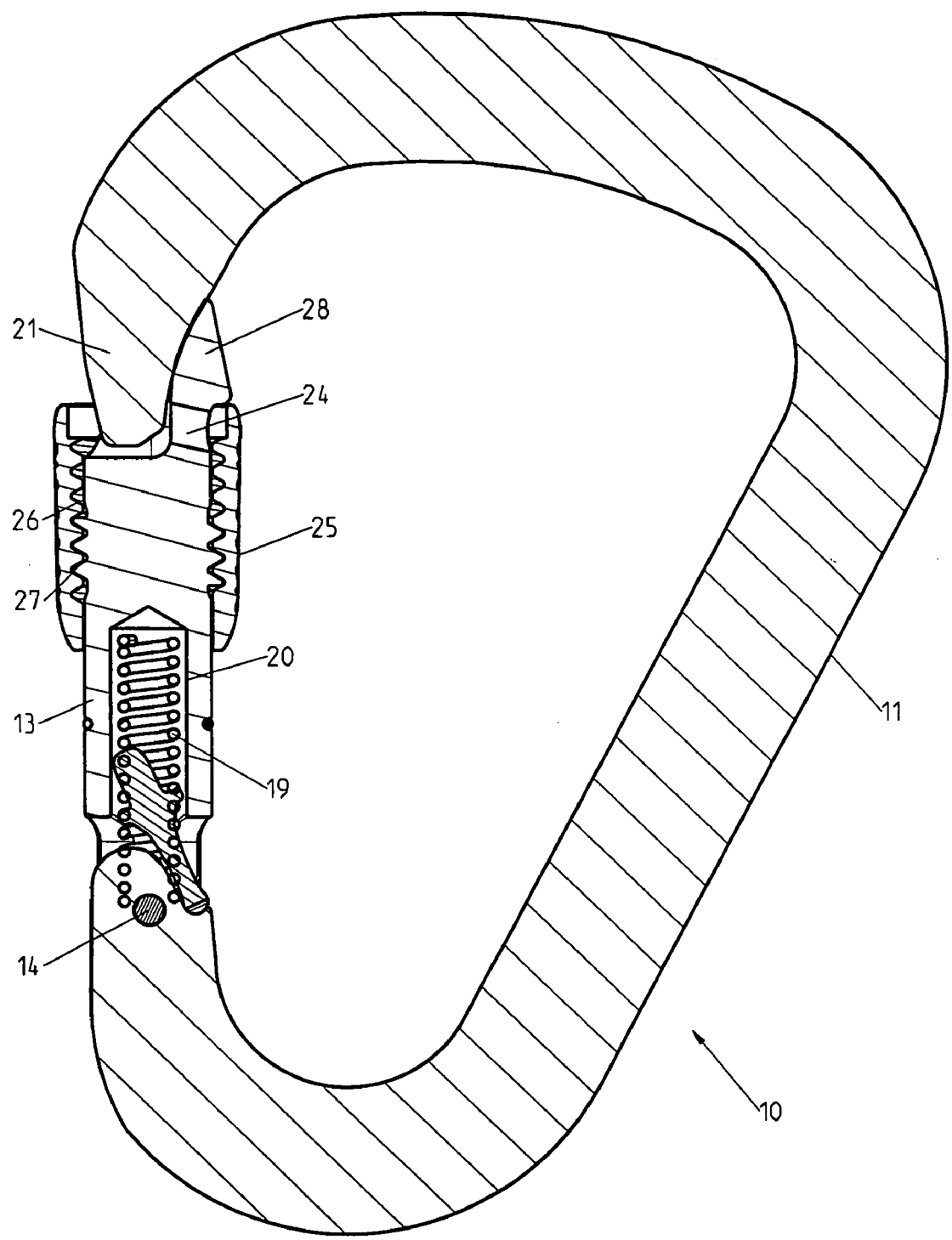
FIG. 4 is a vertical cross-sectional view of FIG. 1.
Figure 5:
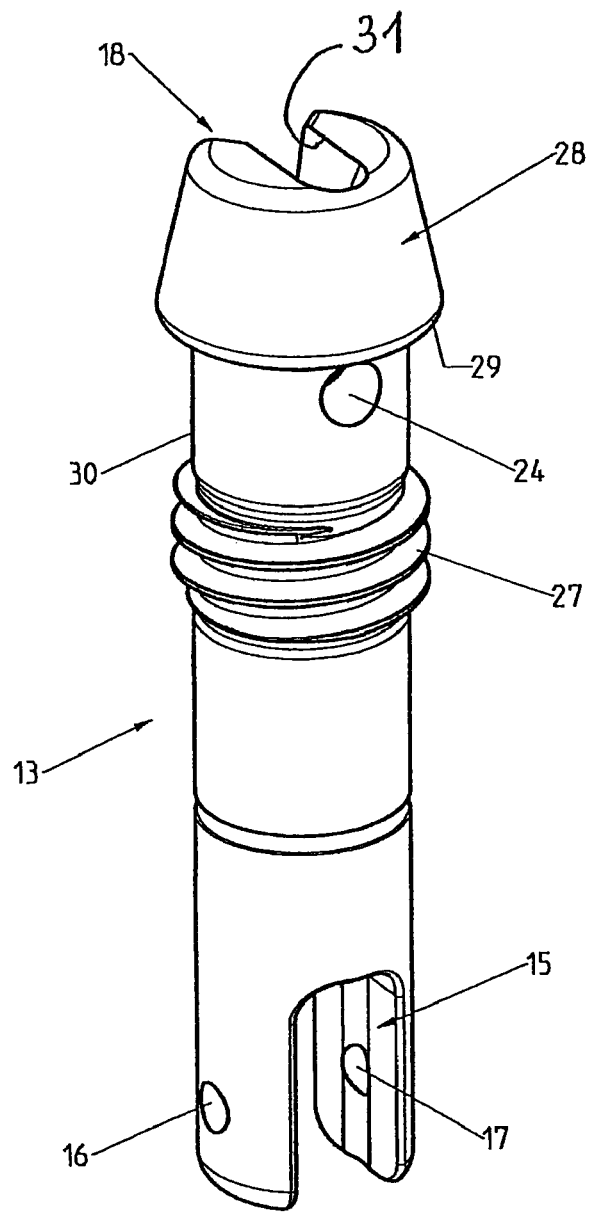
FIGS. 5 and 6 show two perspective views of the movable gate, respectively from the inside and the outside of the body.

Pivoting of gate 13 to the closed position takes place due to the return force of spring 19, ring 25 being in the second unlocked position making colored coating 30 visible. Female latching part 18 of gate 13 engages on male securing part 12 and frustum-shaped end head 28 partially surrounds tab 21 on the inside avoiding any offset with body 11. Ring 25 then simply has to be screwed to move the latter in translation to the first locked position, which is reached when the top end of ring 25 comes up against the stop formed by shoulder 29 of end head 28 (FIGS. 1 and 3). The top part of ring 25 is pressing on protuberance 22 of fixed securing part 12, preventing any pivoting movement of gate 13 towards the inside of body 11. Colored coating 30 is then hidden by ring 25, which indicates the positive locking state of carabiner in the closed position.

The presence of frustum-shaped end head 28 enables the rope to slide well inside body 11 when gate 13 is closed. The external diameter of shoulder 29 corresponds substantially to the diameter of locking ring 25.

According to an alternative embodiment, screw-type locking ring 25 can be replaced by a sliding or rotary ring equipped with a latch.

The invention claimed is:

1. A carabiner comprising:
    a fixed C-shaped body having a first end shaped as a securing part, and an opposite second end on which is pivotally mounted a gate movable around a pivoting axis between a closed position and an open position, said gate comprising:
    a latching part, situated opposite the pivoting axis, that operates in conjunction with the securing part in the closed position,
    a return spring biasing the gate to the closed position,
    a locking ring fitted coaxially around the gate and having a smaller length than that of the gate, said ring being movable between a first locked position wherein the gate is locked in the closed position and a second unlocked position wherein the gate is moveable to the open position,
    wherein the latching part is capped by an end head partially surrounding the securing part in the closed position of the gate, said end head having a frustum-shaped lateral portion joined to the end of said gate by an annular shoulder that is an end-of-travel stop for the ring in the first locked position,
    wherein the external diameter of said shoulder corresponds substantially to the external diameter of the locking ring.

2. The carabiner according to claim 1, wherein the frustum-shaped end head presents an angle of incline comprised between 10° and 20° with respect to the longitudinal direction of the gate.

3. The carabiner according to claim 1, wherein the securing part comprises a tab and a protuberance forming an inverted T-shaped structure, and the latching part is provided with a recess for receiving the securing part.

4. The carabiner according to claim 1, wherein the locking ring comprises a first thread operating by screwing in conjunction with a second thread of the gate, which has a smaller number of screw turns than that of the first thread.

5. The carabiner according to claim 4, wherein the periphery of the gate situated between the second thread and the shoulder comprises a colored coating visible when the ring is in the second unlocked position.

\* \* \* \* \*